(12) United States Patent
Rajuladevi Manikyam et al.

(10) Patent No.: US 12,591,417 B1
(45) Date of Patent: Mar. 31, 2026

(54) CODE GENERATING PROCESS FOR GENERATING STREAM PROCESSING CODE

(71) Applicant: Intuit Inc., Mountain View, CA (US)

(72) Inventors: Aishwarya Rajuladevi Manikyam, Santa Clara, CA (US); Tharathorn Rimchala, San Francisco, CA (US); Harish Nagu Sana, San Jose, CA (US); Pratiti Deb, Milpitas, CA (US); Shradha Ambekar, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/376,772

(22) Filed: Oct. 31, 2025

(51) Int. Cl.
*G06F 8/33* (2018.01)

(52) U.S. Cl.
CPC ...................................... *G06F 8/33* (2013.01)

(58) Field of Classification Search
CPC ........................................................ G06F 8/33
USPC ...................................... 717/106; 706/25–45
See application file for complete search history.

(56) References Cited

U.S. PATENT DOCUMENTS

| | | | | | |
|---|---|---|---|---|---|
| 8,478,800 | B1 * | 7/2013 | Johnson | ................ | G06F 16/904 707/827 |
| 9,632,754 | B2 * | 4/2017 | Gyure | ................ | G06F 11/3684 |
| 11,782,732 | B1 * | 10/2023 | Angioletti | ................ | G06F 8/71 717/151 |
| 12,418,555 | B1 * | 9/2025 | Skarphedinsson | ........................... | G06F 9/45533 |
| 12,517,724 | B2 * | 1/2026 | Rahman | .................... | G06F 8/75 |
| 12,524,499 | B2 * | 1/2026 | Mystetskyi | ........... | G06F 18/217 |
| 12,524,539 | B2 * | 1/2026 | Gazit | .................... | G06F 21/563 |

OTHER PUBLICATIONS

Dehaerne et al, "Code Generation Using Machine Learning: A Systematic Review", IEEE, pp. 1-22 (Year: 2022).*
Song et al, "A Survey of Automatic Generation of Source Code Comments: Algorithms and Techniques", IEEE, pp. 1-18 (Year: 2019).*
Bai et al, "Design of intelligent agents for collaborative testing of service-based systems", ACM, pp. 1-8 (Year: 2011).*

* cited by examiner

*Primary Examiner* — Anil Khatri
(74) *Attorney, Agent, or Firm* — Lathrop GPM LLP

(57) ABSTRACT

A method of improving a code generating process for generating stream processing code. A user input is received and a user intent to generate a stream processing code is extracted from the user intent by a supervising agent. The user input is routed to a code-generating workflow based on the user intent by the supervising agent. The stream processing code and a test file generated by the code-generating workflow are received by a validation agent. The stream processing code is validated using the test file by the validation agent. A validation report indicating whether the stream processing code is valid is generated by the validation agent. The validation report is received and the stream processing code is transmitted to a user by the supervising agent in response to the validation report indicating that the stream processing code is validated.

18 Claims, 5 Drawing Sheets

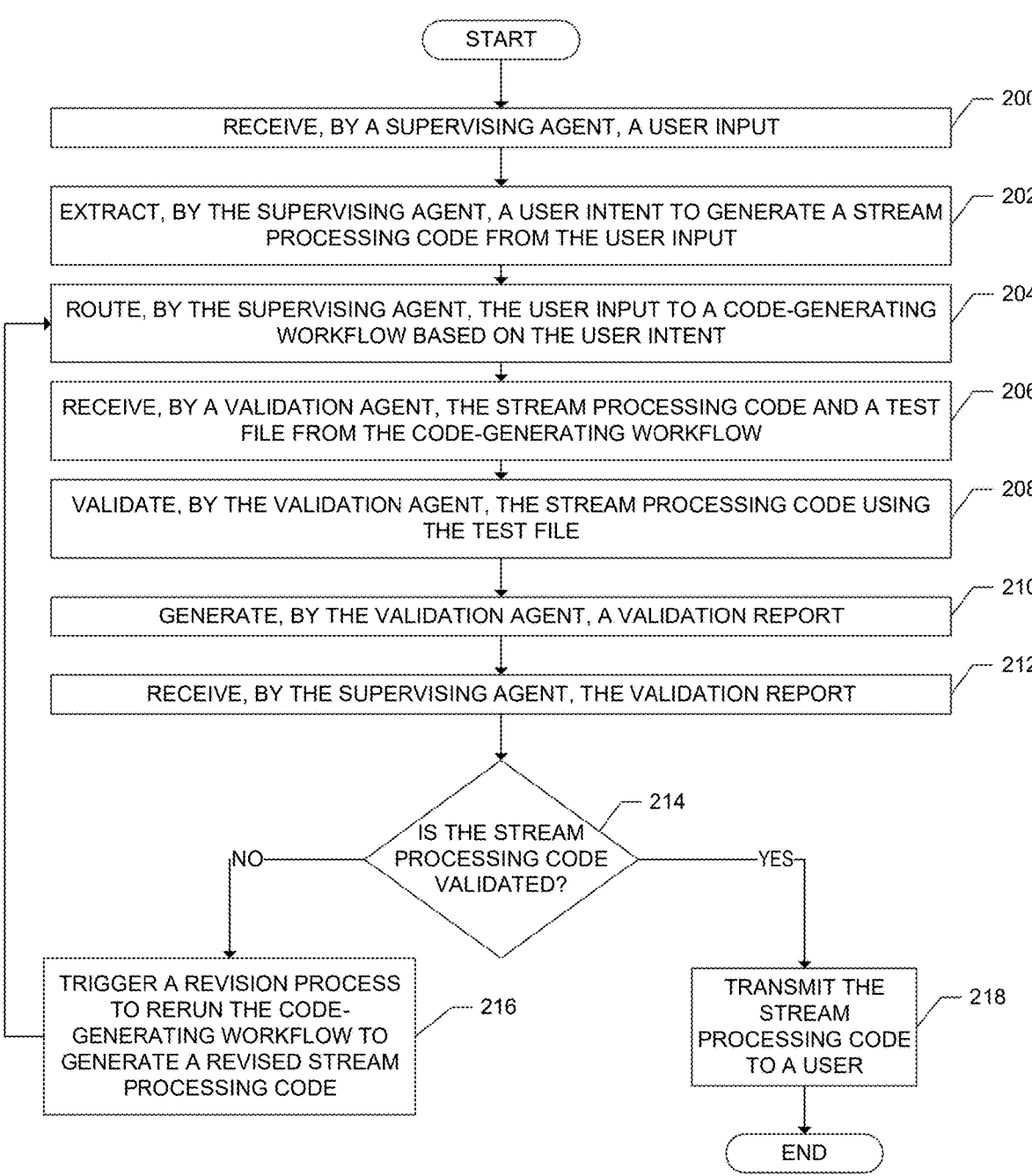

START

RECEIVE, BY A SUPERVISING AGENT, A USER INPUT — 200

EXTRACT, BY THE SUPERVISING AGENT, A USER INTENT TO GENERATE A STREAM PROCESSING CODE FROM THE USER INPUT — 202

ROUTE, BY THE SUPERVISING AGENT, THE USER INPUT TO A CODE-GENERATING WORKFLOW BASED ON THE USER INTENT — 204

RECEIVE, BY A VALIDATION AGENT, THE STREAM PROCESSING CODE AND A TEST FILE FROM THE CODE-GENERATING WORKFLOW — 206

VALIDATE, BY THE VALIDATION AGENT, THE STREAM PROCESSING CODE USING THE TEST FILE — 208

GENERATE, BY THE VALIDATION AGENT, A VALIDATION REPORT — 210

RECEIVE, BY THE SUPERVISING AGENT, THE VALIDATION REPORT — 212

IS THE STREAM PROCESSING CODE VALIDATED? — 214

NO

YES

TRIGGER A REVISION PROCESS TO RERUN THE CODE-GENERATING WORKFLOW TO GENERATE A REVISED STREAM PROCESSING CODE — 216

TRANSMIT THE STREAM PROCESSING CODE TO A USER — 218

END

*FIG. 2*

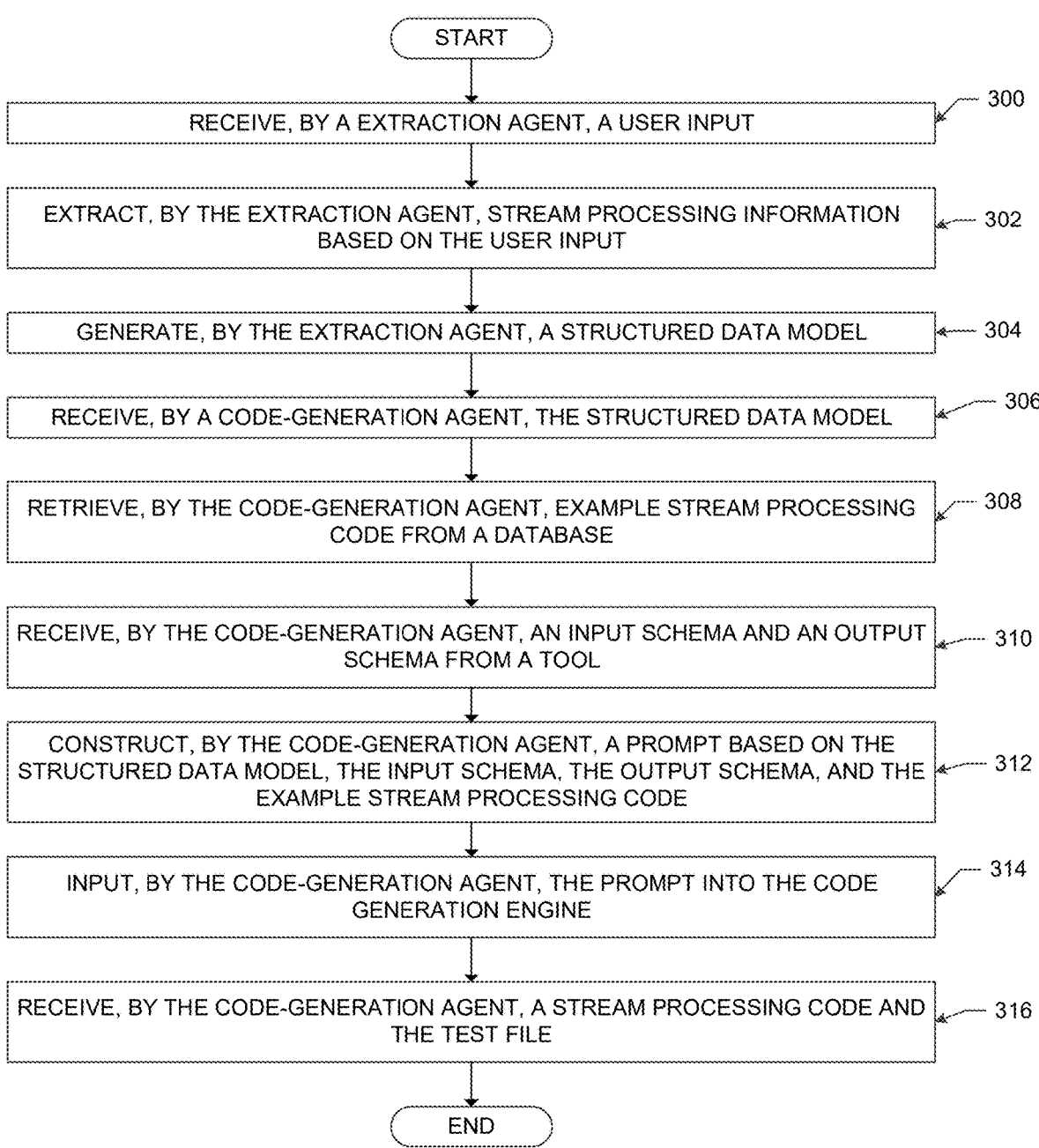

START

RECEIVE, BY A EXTRACTION AGENT, A USER INPUT — 300

EXTRACT, BY THE EXTRACTION AGENT, STREAM PROCESSING INFORMATION BASED ON THE USER INPUT — 302

GENERATE, BY THE EXTRACTION AGENT, A STRUCTURED DATA MODEL — 304

RECEIVE, BY A CODE-GENERATION AGENT, THE STRUCTURED DATA MODEL — 306

RETRIEVE, BY THE CODE-GENERATION AGENT, EXAMPLE STREAM PROCESSING CODE FROM A DATABASE — 308

RECEIVE, BY THE CODE-GENERATION AGENT, AN INPUT SCHEMA AND AN OUTPUT SCHEMA FROM A TOOL — 310

CONSTRUCT, BY THE CODE-GENERATION AGENT, A PROMPT BASED ON THE STRUCTURED DATA MODEL, THE INPUT SCHEMA, THE OUTPUT SCHEMA, AND THE EXAMPLE STREAM PROCESSING CODE — 312

INPUT, BY THE CODE-GENERATION AGENT, THE PROMPT INTO THE CODE GENERATION ENGINE — 314

RECEIVE, BY THE CODE-GENERATION AGENT, A STREAM PROCESSING CODE AND THE TEST FILE — 316

END

*FIG. 3*

CODE GENERATING PROCESS FOR GENERATING STREAM PROCESSING CODE

BACKGROUND

Code generators, such as artificial intelligence (AI) code generators, use AI and machine learning (ML) to write executable code based on user instructions to the code generator to generate the code. Code generators may be used to aid a developer in writing code in a new language, streamline development of a software, or debug existing code.

Existing code generators lack specific domain knowledge for generating code for enterprise software platforms such as stream processing platforms (SPP) and as a result, provide ineffective code for SPP. More specifically, existing code generators construct prompts by indexing an entire repository of codes and conducting vector searches on the indexed code base, which may include non-SPP information. Thus, code for SPPs obtained from existing code generators may contain multiple errors and hallucinations, resulting in a manual and time-intensive process to review and debug the code.

The outlined technical problem may present a particular difficulty in which feature engineering involves near real-time features from streaming data. Feature engineering includes manipulating raw data into numerical features that can be fed directly into machine learning algorithms. Feature processors of SPPs perform feature engineering by computing features on streaming data in near real-time. However, to correctly implement the feature processors in an SPP, developers have to learn and debug feature engineering processes in a new language for SPP. Learning and debugging feature engineering processes is currently a manual and time-intensive process, even with existing code generators. For example, existing code generators may retrieve incorrect contextual information (e.g., existing codes) to generate the code such as incorrect input schema or output schema. In another example, existing code generators may retrieve incorrect source data schema to generate the code.

Thus, a technical problem exists, specifically developing a code generating process that automates code generation for SPPs using SPP domain specific knowledge.

SUMMARY

One or more embodiments provides for a method for improving a code generating process for generating stream processing code. The method includes receiving, by a supervising agent, a user input. The method also includes extracting, by the supervising agent, a user intent from the user input to generate a stream processing code. The method also includes routing, by the supervising agent, the user input to a code-generating workflow based on the user intent. The method also includes receiving, by a validation agent, the stream processing code and a test file generated by the code-generating workflow. The method also includes validating, by the validation agent, the stream processing code using the test file. The method also includes generating, by the validation agent, a validation report indicating whether the stream processing code is validated. The method also includes receiving, by the supervising agent, the validation report. The method also includes transmitting, by the supervising agent, the stream processing code to a user responsive to the validation report indicating that the stream processing code is validated.

One or more embodiments provides for a system for improving a code generating process for generating stream processing code that includes a computer processor. The system includes a data repository in communication with the computer processor. The data repository stores a user input, a user intent, a stream processing code, a test file, and a validation report. The system also includes a supervising agent which, when executed by the computer processor for a first time receives the user input, extracts the user intent to generate the stream processing code from the user input, and routes the user input to a code-generating workflow based on the user intent. The system also includes a validation agent, which when executed by the computer processor receives the stream processing code and the test file from the code-generating workflow, validates the stream processing code using the test file, and generates the validation report indicating whether the stream processing code is validated. The supervising agent, which when executed by the computer processor for a second time receives the validation report, and transmits the stream processing code to a user responsive to the validation report indicating that the stream processing code is validated.

One or more embodiments provides for a method for improving a code generating process for generating stream processing code. The method includes receiving, by a supervising agent, a user input. The method also includes extracting, by the supervising agent, at least a user intent to generate a stream processing code. The method also includes routing, by the supervising agent, the user input to a code-generating workflow based on the user intent. The code-generating workflow includes receiving, by an extraction agent, the user input. The code-generating workflow also includes extracting, by the extraction agent, stream processing information from a database based on the user input. The code-generating workflow also includes generating, by the extraction agent, a structured data model based on stream processing information. The code-generating workflow also includes receiving, by a code-generation agent, the structured data model. The code-generating workflow also includes retrieving, by the code-generation agent, context from the database based on the structured data model. The code-generating workflow also includes receiving, by the code-generation agent, an input schema and an output schema from a tool. The code-generating workflow also includes constructing, by the code-generation agent, a prompt for a code generation engine based on the structured data model, the input schema, the output schema, and the context. The code-generating workflow also includes inputting, by the code-generation agent, the prompt to the code generation engine. The code-generating workflow also includes receiving, by the code-generation agent, the stream processing code and the at least one test file from the code generation engine. The method also includes receiving, by a validation agent, the stream processing code and the at least one test file generated by the code-generating workflow. The method also includes validating, by the validation agent, the stream processing code using the at least one test file. The method also includes generating, by the validation agent, a validation report indicating whether the stream processing code is validated or is flagged. The method also includes receiving, by the supervising agent, the validation report. The method also includes transmitting, by the supervising agent, the stream processing code to a user when the validation report indicates that the stream processing code is validated or triggering, by the supervising agent, a revision process when the validation report flags the stream processing code.

Other aspects of one or more embodiments will be apparent from the following description and the appended claims.

BRIEF DESCRIPTION OF DRAWINGS

FIG. 2 shows a flowchart of a method for generating and validating stream processing code to yield an improved retrained language model, in accordance with one or more embodiments.

FIG. 3 shows a flowchart of a method for executing a code-generating workflow, in accordance with one or more embodiments.

Like elements in the various figures are denoted by like reference numerals for consistency.

DETAILED DESCRIPTION

Figure 1:
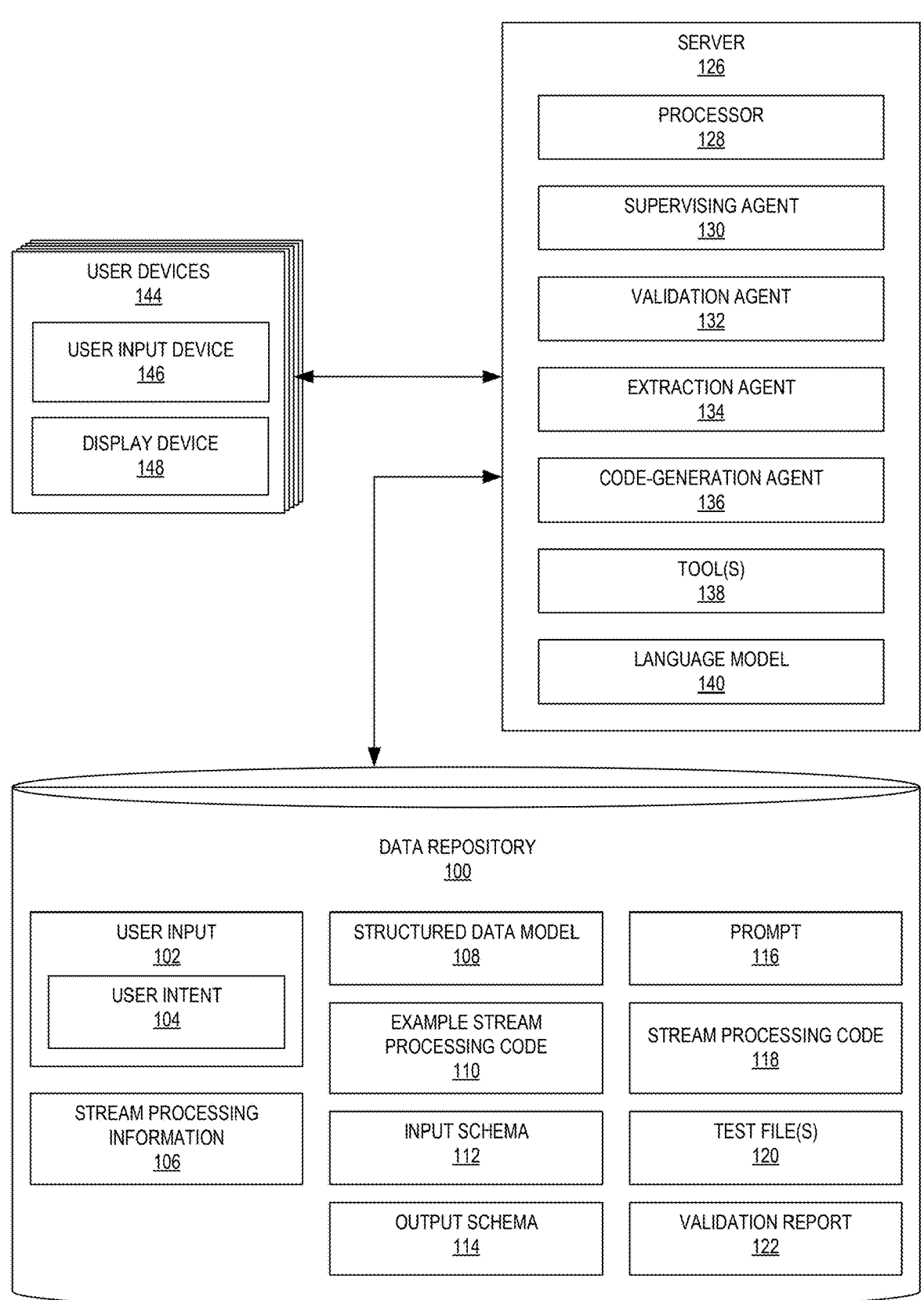
FIG. 1 shows a computing system, in accordance with one or more embodiments.

One or more embodiments are directed to an improved code-generating workflow for SPPs. The improved code-generating workflow solves at least the above-mentioned technical problem. The technical problem, again, is developing an automated code-generating workflow for SPPs.

One or more embodiments include an agentic framework utilizing multiple agents and tools that perform autonomous code generation, end-to-end code validation, and a code revision, if validation fails, for stream processing code. In the agentic framework, a supervising agent extracts a user intent to generate stream processing code from a user input and routes the user input to a code-generating workflow to generate the stream processing code and associated test files.

More specifically, the code-generating workflow uses an extraction agent to extract some use case specific stream processing information from the user input and to retrieve other stream processing meta-information from a database. The extraction agent then generates a structured data model that includes the stream processing information.

The code-generating workflow starts with a code-generation agent using a code retriever tool to retrieve an example stream processing code from a database such as a code repository, using a schema retriever tool to retrieve input schema from a database such as a schema database, and using an output schema extraction tool to extract output schema from the user input. The code-generation agent then constructs a prompt including the example stream processing code, the structured data model containing the streaming processing information, the input schema, and the output schema. The prompt includes accurate information to generate stream processing code for SPPs such that the code-generation engine does not need to index an entire repository of example codes (which may include code other than stream processing code). The code-generation agent also inputs the prompt into a code-generating engine, which outputs the stream processing code and one or more test files.

A validation agent then tests and validates the stream processing code using the test files that were automatically generated by the code-generation agent. The validation agent also generates a validation report that includes detailed scoring of different components of the stream processing code, whether the stream processing code is validated, and/or feedback for revising the stream processing code. Where unit testing and integration testing may be typically executed on sample data, the unit testing and integration testing implemented in the present disclosure is executed on actual stream processing code generated by the code-generating engine.

If the stream processing code is validated, the stream processing code can be provided to a user for entry into, for example, a version control system. If the stream processing code is not validated, then the code-generation process can be repeated to provide a revised stream processing code or the stream processing code can be revised automatically or manually when the stream processing code has minor errors. One or more embodiments provide a practical application as a solution to the technical problem by providing SPP domain specific knowledge to a code-generating workflow that uses an agentic framework, thus code-generation for SPPs is streamlined and automated.

As a specific example, a user input may include a user intent to generate stream processing code for an SPP. The supervising agent uses the user intent to select a code-generating workflow out of a plurality of workflows. The plurality of workflows can include, for example, the code-generating workflow, a data querying workflow, a metadata gathering workflow, etc. In other words, the supervising agent determines that the code-generating workflow is the correct workflow based on the user intent. The supervising agent then routes the user input to the code-generating workflow where the extraction agent extracts a prompt goal, one or more steps for a stream processing logic, a source schema, a target schema, and an output format from the user input or from a database having, for example, one or more code repositories. The extraction agent then generates a structured data model in JSON or XML that includes the prompt goal, the steps for the stream processing logic, the source schema, the target schema, and the output format.

The code-generation agent receives the structured data model from the extraction agent and also receives an example stream processing code, an input schema, and an output schema. The code-generation agent constructs a prompt with the example stream processing code, the input schema, the output schema, and instructions to generate the stream processing code and the test files. The code-generation agent also inputs the prompt into a language model to generate the stream processing code and the test files.

The stream processing code and the test files are then received by the validation agent, which executes at least two validation stages to evaluate and score the stream processing code and to test the stream processing code itself using the test files. The validation agent generates a validation report and provides the validation report, the stream processing code, and the test files to the supervising agent. The supervising agent then determines if the stream processing code is validated and is of a sufficiently high quality, if a revision process is triggered, or if minor errors can be corrected automatically or manually. If the revision process is triggered, the code-generating workflow is repeated using the validation report, the stream processing code, and the test files and the original user query as inputs.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a user input (102). The user input (102) is data provided by a user. The user input (102) is provided in natural language text or media (i.e., video and/or audio) that can be understood by a language model (140) (described below) and includes a user intent (104). The user intent (104) may be explicitly stated in the user input (102) or may be derived by the language model (140) from the user input (102). The user input (102) may also include built-time feature engineering code (if existing), notebooks, and/or other computing documents. An example of the user input (102) is a prompt stating "Please implement a stream processing code using Flink's mapping function. Your goal is to generate Java code and corresponding integration tests using the Apache Flink DataStream Java API for a stream processing job that performs data processing based on the goal and processing logic specified."

The data repository (100) also stores stream processing information (106). The stream processing information (106) is data used to define and generate stream processing code (118) (defined below). In other words, the stream processing information (106) provides inputs, limitations, data, definitions, etc. used to generate the stream processing code. The stream processing information (106) is extracted from the user input (102) and can also be obtained from the data repository (100) or another database. The stream processing information (106) can include, for example, a prompt goal, one or more steps for a stream processing logic, a source schema or input schema, a target schema, an output format, and/or a sample input. The target schema is the schema of data after transformation during execution of the stream processing code (118). An example of the target schema for transformation from a person to geography featurization is {"ZIP": "integer", # integer representing enum index for zip code; "STATE": "integer", # integer representing enum index for state}. The output format is the format of the output of the code generation engine that generates the stream processing code (118). An example of the output format for the stream processing code is {"SPP_code": tuple ["path", "str"], # a tuple representing the file path and the content of generated SPP code; "unit_tests": list [tuple ["path", "str"]], # a list of tuple representing the (path, content) pair for each unit test file; "integration_tests": tuple["path", "str"],"]], # a list of tuple representing the (path, content) pair for each integration test file; "reasoning": "str" # optional explanation for the SPP code and unit tests and integration tests}.

The data repository (100) also stores a structured data model (108). The structured data model (108) includes the stream processing information in a standardized format. The structured data model (108) is also the data object contain key information needed to provide to the language model (140) such as, for example, a prompt goal, processing logic, etc. The structured data model (108) may be provided in, for example, JavaScript Object Notation (JSON) or in an Extensible Markup Language (XML), or in relational databases or columnar databases. Example data that may be in a structured data model (108) includes {"goal": "compute detailed information from ip address", "input_schema": "Person", "ProcessingLogic": ["Extraction ip address fields from the input data", "Make an API call to ip2geo lookup service", "Retain the address and location fields from the ip2geo lookup output", "Convert state field into Enum using StateEnum lookup", "Convert ZipCode field into index using ZipEnum lookup", "Store data into 2×1 vector where the first dimension is StateEnum, and last index is ZipEnum"], "output_schema": "etc"}.

The data repository (100) also stores an example stream processing code (110). The example stream processing code is stream processing code that already exists or has already been generated. The example stream processing code can be, for example, a boilerplate stream processing code or previously generated stream processing code.

The data repository (100) also stores an input schema (112). The input schema (112) defines a structure of data for input data that will be processed by the stream processing code (118). More specifically, each input schema (112) includes input fields such as a name (e.g., key words in the input data), a data type (e.g., whether the input data is a string, an integer, a float, or a Boolean), and a value type (e.g., a dynamic value or static value of the input data), nullability (e.g., whether the value can be nulled). The input schema (112) is used to check that data being sent to the stream processing code (118) is valid input prior to inputting the data into the stream processing code (118). An examples of the input schema (112) for a person includes: {"name": "John", "Age": "20", "ip_address": "192.168.1.1"}.

The data repository (100) also stores an output schema (114). The output schema (114) defines a structure of data that will be output from the stream processing code (118). More specifically, each output schema (114) includes output fields such as a name (e.g., key words in the output data) and a data type (e.g., whether the input data is a string, an integer, a float, or a Boolean). The output schema (114) is used to check that data being output from the stream processing code (118) is properly formatted. An example of the output schema (114)) for a person includes: {[{"attribute_name": "first_name", "data_type": "str", "nullable": "false"}, {"attribute_name": "age", "data_type": "smallint", "nullable": "true"}, {"attribute_name": "ip_address": "str", "nullable": "false"}.

The data repository (100) also stores a prompt (116). The prompt (116) is a set of data that can be interpreted and understood by the language model (140) and describes a desired output of the language model (140). The prompt (116) can include, for example, natural language text and/or media to describe the desired output. More specifically, the prompt (116) includes the structured data model (108), the example stream processing information (106), the input schema (112), and the output schema (114).

The data repository (100) also stores a stream processing code (118). The stream processing code (118) is a set of instructions for a computer that is written in a programming language. More specifically, the stream processing code (118) is used for feature engineering for real-time feature computation in a stream processing platform. In other words, the stream processing code (118) receives real-time streaming data and processes the real-time streaming data to determine or develop features for a machine learning model. Stream processing code (118) can be used to process data in real-time to, for example, provide real-time fraud detection, dynamic pricing, or targeted marking.

The data repository (100) also stores test file(s) (120). The test files (120) are data files used to test the stream processing code (118). The test files (120) can include, for example, test input data, target output data, unit tests, and/or integration tests. The test files (120) can be used to, for example, execute the stream processing code (118) using the test input data and compare an accuracy of output from the stream processing code (118) to the target output data.

The data repository (100) also stores a validation report (122). The validation report (122) includes whether the stream processing code (118) is validated or flagged, feedback for the stream processing code (118), and a summary of outputs from testing the stream processing code (118). The feedback can include, for example, a score of the stream processing code (118) and/or recommendations for fixing or optimizing portions of the stream processing code (118).

The system shown in FIG. 1 may include other components. For example, the system shown in FIG. 1 also may include a server (126). The server (126) is one or more computer processors, data repositories, communication devices, and supporting hardware and software. The server (126) may be in a distributed computing environment. The server (126) is configured to execute one or more applications, such as a supervising agent (130), a validation agent (132), an extraction agent (134), a code-generation agent (136), and/or one or more tool(s) (138). An example of a computer system and network that may form the server (126) is described with respect to FIG. 5A and FIG. 5B.

The server (126) includes a computer processor (128). The computer processor (128) is one or more hardware or virtual processors which may execute computer readable program code that defines one or more applications, such as a language model (140), the supervising agent (130), the validation agent (132), the extraction agent (134), the code-generation agent (136), and/or the tool(s) (138). An example of the computer processor (128) is described with respect to the computer processor(s) (502) of FIG. 5A.

The server (126) includes several agents as will be defined below and the functionality of each agent will be described in detail in FIGS. 2 and 3. An agent is a computer program that can perform tasks autonomously or semi-autonomously on behalf of a user or a system. In other words, the agent can operate independently of a human user or operator.

The server (126) also includes the supervising agent (130). The supervising agent (130) is a computer program that can receive the user input (102), extract the user intent (104) from the user input (102), and route the user input to a code-generating workflow. The supervising agent (130) can also receive the validation report (122) and determine if the stream processing code (118) is validated or unvalidated. If the stream processing code (118) is unvalidated, the supervising agent (130) can trigger a revision process to revise the stream processing code (118).

The server (126) also includes the validation agent (132). The validation agent (132) is a computer program that can receive the stream processing code (118) and the test files (120), validate the stream processing code (118) using the test files (120), and generate the validation report (122).

The server (126) also includes the extraction agent (134). The extraction agent (134) is a computer program that can receive the user input (102), extract the stream processing information (106), and generate the structured data model (108) from the user input and the stream processing information (106).

The server (126) also includes the code-generation agent (136). The code-generation agent (136) is a computer program that can receive the structured data model (108), the input schema (112), the output schema (114), and the example stream processing code (110), generate the prompt (116), input the prompt (116) into a code generation engine, and receive the stream processing code (118) and the test files (120) from the code generation engine.

The server (126) also includes the tools (138). The tools (138) are application programming interface (API) calls or API requests to a server asking an API to provide a service or information. For example, the tools (138) can be used to retrieve the input schema (112), the output schema (114), and the example stream processing code (110) and to execute specialized assessments for validating the stream processing code (118).

The server (126) also includes the language model (140). The language model (140) is a natural language processing machine learning model. An example of the language model (140) may be a large language model (LLM), such as CHATGPT®. However, many different language models may be used.

The system shown in FIG. 1 also may include one or more user devices (144). The user devices (144) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

Figure 5A:
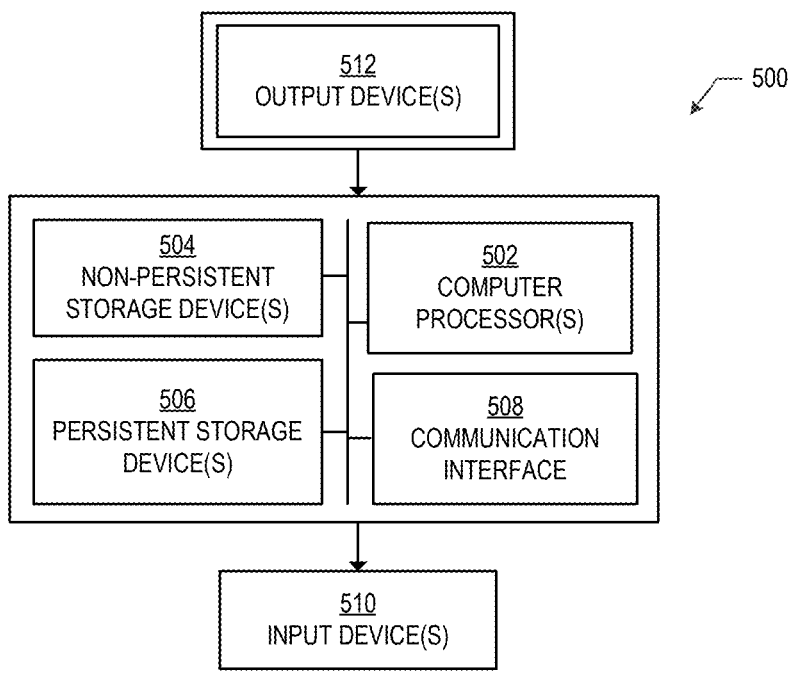
FIG. 5A and FIG. 5B show an example of a computing system and network environment, in accordance with one or more embodiments.

In any case, the user devices (144) are computing systems (e.g., the computing system (500) shown in FIG. 5A) that communicate with the server (126). The user input (102) may be received from one or more of the user devices (144). In another embodiment, one or more of the user devices (144) may be operated by a computer technician that services the various components of the system shown in FIG. 1. The user devices (144) may also include a user input device (146) and/or a display device (148).

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for generating and validating stream processing code, in accordance with one or more embodiments. The method of FIG. 2 may be implemented using the system of FIG. 1 and one or more of the steps may be performed on or received at one or more computer processors. The method of FIG. 2 may be characterized as a method for automating code generation and validation of stream processing code.

Step 200 includes receiving, by a supervising agent, a user input. The user input is received from the user device. The user input can include text, images, and/or videos and includes a user intent. The user input can also include built-time feature engineering code (if existing), notebooks, and/or or other computing documents.

Step 202 includes extracting, by the supervising agent, the user intent to generate a stream processing code from the user input. The supervising agent may extract the user intent using a language model. More specifically, the supervising agent sends a prompt with the user input into a language model with instructions to extract the user intent. The prompt requests that the language model provide the user intent. Responsive to the user input, the language model outputs the user intent to generate the stream processing code.

Step 204 includes routing, by the supervising agent, the user input to a code-generating workflow based on the user intent. The code-generating workflow is described in detail in FIG. 3. The code-generating workflow outputs the stream processing code and the one or more test files.

Step 206 includes receiving, by a validation agent, the stream processing code and the test file from the code-generating workflow. In other words, the stream processing code and the one or more test files are transmitted by the code-generating workflow to the validation agent.

Step 208 includes validating, by the validation agent, the stream processing code using the test file. Validating the stream processing code includes at least two stages of validating. In a first stage of validating, the validation agent sends a prompt to the language model instructing the language model to provide feedback about the stream processing code as output. The language model, in response to the prompt, outputs the feedback. The feedback can include, for example, a score of the stream processing code at the entire code file level, code block (functional unit) level, or line levels, and/or recommendations for fixing or optimizing portions of the stream processing code.

In a second stage of validating, the validation agent inputs the stream processing code and the test files into a compiler that compiles the stream processing code. After compilation, the validation agent executes the stream processing code using the test files. The test files specify particular streaming input and the correct streaming output. Thus, executing the testing files results in generating output from the particular streaming input. The validation agent compares the output from the execution with the correct output to generate a validation result. For example, the validation result may be validated or flagged for errors. Thus, the validation agent beneficially provides end to end validation of the stream processing code, whereas conventional code validation agents typically only conduct unit testing. Further, the validation agent provides granular feedback and scoring at the line level and provides suggestions for how to improve or fix the codes to resolve testing errors and improve validation scores.

The validation agent can also use one or more tools to execute additional validation processes. For example, the validation agent can use a linting tool to check for code style and syntax errors, a unit test runner tool to execute unit tests, and/or an integration test runner tool to execute integration tests against synthetic or real data streams.

The validation agent can also assess the stream processing code for specific metrics such as, for example, an accuracy of the implemented data transformation logic in the stream processing code, a correctness of input data types and output data types, and/or a coverage of features that the stream processing code is intended to generate.

Step 210 includes generating, by the validation agent, a validation report. The validation report includes the feedback generated in the first stage of validating and a summary of the outputs generated in the second stage of validating. The validation report may also include whether the stream processing code is validated. If not validated, the stream processing code may have one or more flags indicating that the stream processing code is invalid and may need to be revised.

Step 212 includes receiving, by the supervising agent, the validation report. The validation report is received from the validation agent.

Step 214 includes determining, by the supervising agent, if the stream processing code is valid. The supervising agent determines if the stream processing code is valid based on the validation report. For example, the validation report may include that the stream processing code is validated, and no further revisions are needed. In another example, the validation report may include feedback or recommendations for revising the code, indicating that the stream processing code is not validated.

Step 216 includes triggering, by the supervising agent, a revision process to rerun the code-generating workflow to generate a revised stream processing code if the stream processing code is not valid. The revision process can include transmitting, by the supervising agent, the stream processing code, the test files, and the validation report to the code-generating workflow, the structure data model, and the original user input to yield a revised stream processing code and revised test files based on the validation report. The validation agent can then execute one or more stages of validating on the revised stream processing code using the revised test files and generate an updated validation report.

The revision process can be repeated until the stream processing code is validated or a number of revision processes meets a predetermined revision process threshold. In other words, the revision process can be repeated until the number of revision processes meets the predetermined revision process threshold so as to prevent the revision process from indefinitely repeating or repeating to a number of times that is ineffective to process.

Step 218 includes transmitting, by the supervising agent, the stream processing code to a user if the stream processing code is valid. The stream processing code can be transmitted to the user via the user device. The stream processing code can then be, for example, sent to a version control system for deployment.

While the various steps in this flowchart are presented and described sequentially, at least some of the steps may be executed in different orders, may be combined or omitted, and at least some of the steps may be executed in parallel. Furthermore, the steps may be performed actively or passively.

FIG. 3 shows a flowchart of a method for a code-generating workflow, in accordance with one or more embodiments. The method of FIG. 3 expands upon the code-generating workflow recited in Step 204 described above and provides the stream processing code and the test file received by the validation agent in Step 206. The method of FIG. 3 may be implemented using the system of FIG. 1 and one or more of the steps may be performed on or received at one or more computer processors. The method of FIG. 3 may be characterized as a method for automating code generation for a stream processing code.

Step 300 includes receiving, by an extraction agent, a user input. The user input is received from the supervising agent when the supervising agent routes the user input to the code-generating workflow in Step 204 of FIG. 2 above.

Step 302 includes extracting, by the extraction agent, stream processing information based on the user input. The extraction agent may use a language model to extract the stream processing information from the user input. The stream processing information can include, for example, a prompt goal, one or more steps for a stream processing logic, a source schema, a target schema, an output format, and/or a sample input. The extraction agent may also retrieve or use a tool to retrieve some of the stream processing information from a database. For example, the source schema, target schema, and/or output format may be retrieved from a database.

Step 304 includes generating, by the extraction agent, a structured data model. The extraction agent may also use the language model to generate the structured data model. More specifically, the extraction agent may input the stream processing information, instructions to generate the structured data model, and the type of structured data into the language model. The language model may then, in response to the user input, output the structured data model.

Step 306 includes receiving, by a code-generation agent, the structured data model. The structured data model is received from the extraction agent.

Step 308 includes retrieving, by the code-generation agent, example stream processing code from a database. The example stream processing code is retrieved based on the user input to generate the stream processing code. In other words, because the user input specifies that stream processing code is to be generated, example stream processing code similar to the requested stream processing code is retrieved. Alternatively, the code-generation agent may use a tool to retrieve the example stream processing code. The tool may be an application programming interface (API) call or API request to a server asking an API to provide the example stream processing code. In another alternative, the example stream processing code can be provided in the user input.

Step 310 includes receiving, by the code-generation agent, an input schema and an output schema from a tool. The input schema and the output schema may be retrieved by the tool from the database. More specifically, a table name or an entity name may be extracted from the user input or from existing built time notebooks provided in the user input (e.g., transforming geography (state, zip code) obtained from Person information into features). The code-generating agent can then use commands such as, for example, table_search or entity_search tool, to locate the most probably entity or table that matches the user input. After the entity or table is identified, the agent can use a schema_retrieval tool to retrieve the input schema and output schema from the entity or the table. For tables, the schema_retrieval tool can execute 'DESCRIBE FORMAT-TED $TABLE NAME' queries. For entities, each entity may have a unique identifier and the schema retrieval tool can retrieve the input schema and the output schema based on the unique identifier.

Step 312 includes constructing, by the code-generation agent, a prompt based on the structured data model, the input schema, the output schema, and the example stream processing code. The code-generation agent may use the language model to generate the prompt. In such embodiments, the code-generation agent inputs the structured data model, the input schema, the output schema, the example stream processing code, and instructions to generate a prompt for generating the stream processing code and test files into the language model and receives the prompt as output from the language model. The prompt includes accurate information to generate stream processing code for SPPs and thus, prevents hallucinations from the language model when generating the stream processing code.

Step 314 includes inputting, by the code-generation agent, the prompt into the code-generation engine. The code-generation engine may be a language model. In such embodiments, the prompt is sent to the language model and the stream processing code and the test files are received as output from the language model.

Step 316 includes receiving, by the code-generation agent, a stream processing code and the test files. The stream processing code and the test files are received from the code-generation engine. The test files can include, for example, test input data, target output data, unit tests, and/or integration tests that can be used by the validation agent, described above in FIG. 2.

While the various steps in this flowchart are presented and described sequentially, at least some of the steps may be executed in different orders, may be combined or omitted, and at least some of the steps may be executed in parallel. Furthermore, the steps may be performed actively or passively.

Figure 4:
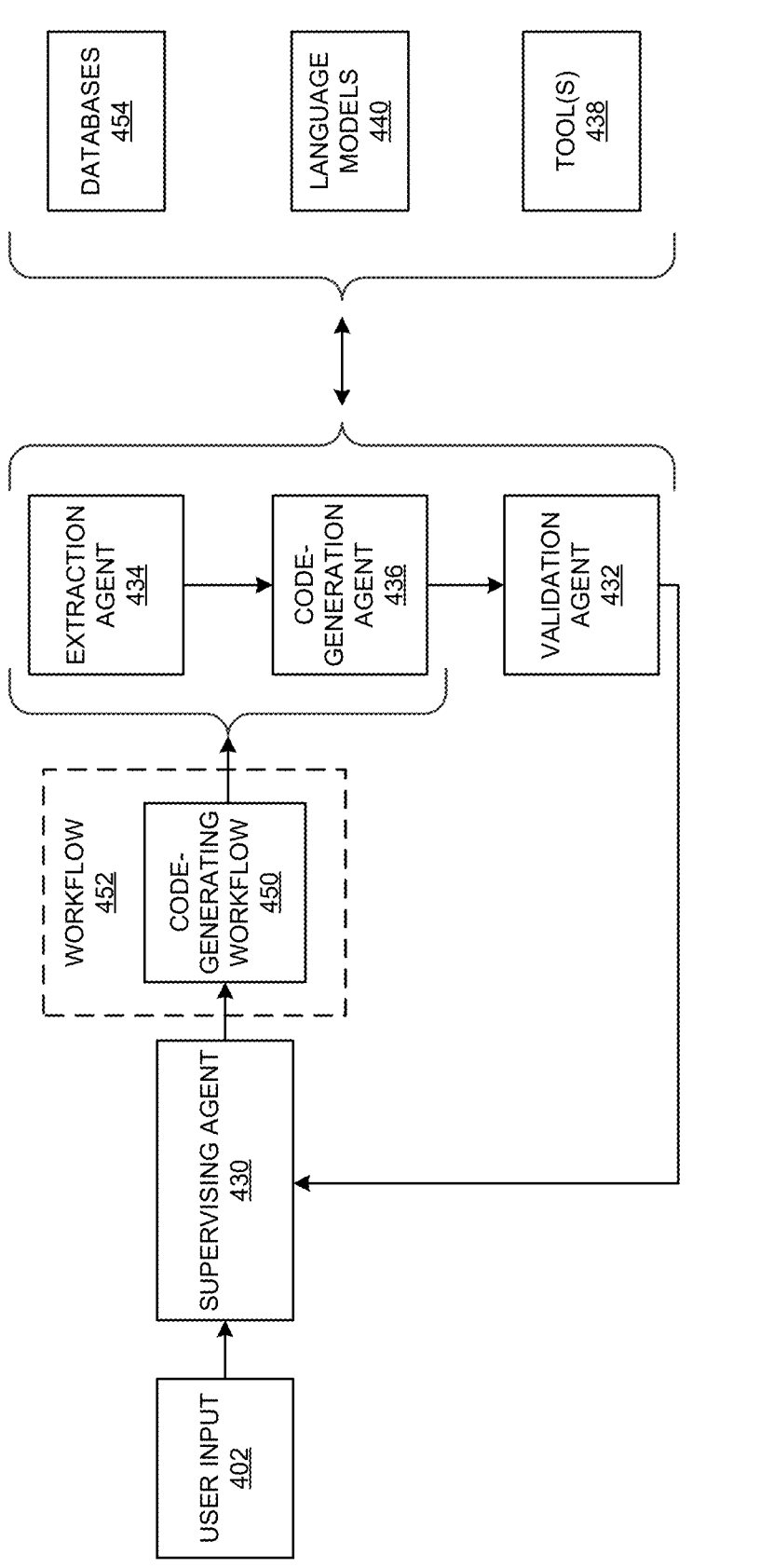
FIG. 4 shows a dataflow for generating and validating stream processing code in accordance with one or more embodiments.

FIG. 4 shows an example dataflow for automatically generating and validating stream processing code for a stream processing platform, in accordance with one or more embodiments. The following example is for explanatory purposes only and not intended to limit the scope of one or more embodiments.

As shown, user input (402), which includes a user intent to generate stream processing code, is received by a supervising agent (430). As previously described, an example of the user input (402) can include, "Please implement a stream processing code using Flink's mapping function. Your goal is to generate Java code and corresponding integration test using the Apache Flink DataStream Java API for a stream processing job that performs data processing based on the goal and processing logic specified." The supervising agent (430) extracts the user intent to generate the stream processing code, and more specifically, Java code, and routes the user input (402) to a code-generating workflow (450). As shown, the code-generating workflow (450) is one workflow of a plurality of workflows (452). Thus, the supervising agent (430) determines to send to the user input (402) to the code-generating workflow (450) based on the user intent to specifically generate the stream processing code.

The code-generating workflow (450) utilizes an extraction agent (434) and a code-generation agent (436) to generate the stream processing code and associated test files, as will be described below.

The extraction agent (434) extracts a prompt goal (e.g., "Your goal is to generate Java code and corresponding integration test using the Apache Flink DataStream Java API for a stream processing job that performs data processing based on the goal and processing logic specified."), one or more steps for a stream processing logic (e.g., Step 1: Parse the input strings into a Java POJO and Step 2: Filter out messages that cannot be serialized into JSON), a source schema, a target schema, and an output format (e.g., JSON or XML) based on the user input (402) using a language model (440). In some examples, the prompt goal and the steps for the stream processing logic may be extracted directly from the user input (402) and the extraction agent (434) may retrieve the source schema, the target schema, and the output format from a database (454) based on the user input (402). In some examples, the user input (402) may also include the source schema, the target schema, and the output format. The extraction agent (434) then generates a structured data model in JSON or XML that includes the prompt goal, the steps for the stream processing logic, the source schema, the target schema, and the output format.

The code-generation agent (436) receives the structured data model from the extraction agent (434). The code-generation agent (436) also receives an example stream processing code, an input schema, and an output schema. The code-generation agent (436) may use one or more tools (438) to retrieve any of the example stream processing code, the input schema, and/or the output schema from the database (454). The code-generation agent (436) then constructs a prompt with the example stream processing code, the input schema, the output schema, and instructions to generate the stream processing code and the test files. The code-generation agent (436) also inputs the prompt into a language model to generate the stream processing code and the test files.

After the code-generating workflow is complete, the stream processing code and the test files are received by the validation agent (432) to validate the stream processing code. The validation agent (432) executes at least two validation processes to evaluate and score the stream processing code and to test the stream processing code itself using the test files. The validation agent (432) generates a validation report and provides the validation report, the stream processing code, and the test files to the supervising agent (430). The supervising agent (430) then determines if the stream processing code is validated or if a revision process is triggered. If the revision process is triggered, the code-generating workflow is repeated using the validation report, the stream processing code, and the test files.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
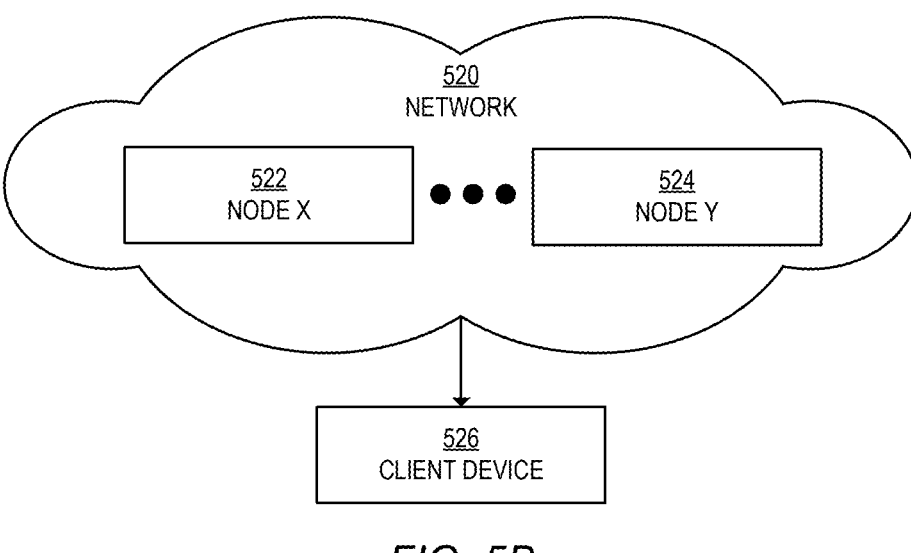

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   receiving, by a supervising agent, a first user input;
   extracting, by the supervising agent, a first user intent from the first user input to generate a first stream processing code;
   routing, by the supervising agent, the first user input to a code-generating workflow based on the first user intent;
   receiving, by a validation agent, the first stream processing code and a first test file generated by the code-generating workflow;
   validating, by the validation agent, the first stream processing code using the first test file;
   generating, by the validation agent, a first validation report indicating whether the first stream processing code is validated;
   receiving, by the supervising agent, the first validation report;
   transmitting, by the supervising agent, the first stream processing code to a user responsive to the first validation report indicating that the first stream processing code is validated;
   routing, by the supervising agent, a second user input to the code-generating workflow based on a second user intent in the second user input;
   receiving, by the validation agent, a second stream processing code and a second test file;
   validating, by the validation agent, the second stream processing code using the second test file generated by the code-generating workflow;

generating, by the validation agent, a second validation report indicating that the second stream processing code is flagged; and
   triggering, by the supervising agent, a revision process responsive to the second validation report flagging the second stream processing code.

2. The method of claim 1, wherein the revision process is repeated until at least one of the second stream processing code is validated or a number of revision processes meets a predetermined revision process threshold.

3. The method of claim 1, wherein the revision process includes transmitting, by the supervising agent, the second stream processing code, the second test file, and the second validation report to the code-generating workflow to yield a revised stream processing code and a revised test file based on the second validation report.

4. The method of claim 1, wherein the code-generating workflow comprises:
   receiving, by an extraction agent, the first user input;
   extracting, by the extraction agent, stream processing information from a database based on the first user input;
   generating, by the extraction agent, a structured data model based on the stream processing information;
   receiving, by a code-generation agent, the structured data model;
   retrieving, by the code-generation agent, an example stream processing code from the database based on the structured data model;
   receiving, by the code-generation agent, an input schema and an output schema from a tool;
   constructing, by the code-generation agent, a prompt for a code generation engine based on the structured data model, the input schema, the output schema, and the example stream processing code;
   inputting, by the code-generation agent, the prompt to the code generation engine; and
   receiving, by the code-generation agent, the first stream processing code and the first test file from the code generation engine.

5. The method of claim 4, wherein the code generation engine comprises a large language model (LLM).

6. The method of claim 4, wherein the code-generating workflow further comprises:
   transmitting, by the extraction agent, a request for supplementary information for the first stream processing code from a user; and
   receiving, by the extraction agent, the supplementary information from the user,
   wherein generating, by the extraction agent, the structured data model is further based on the supplementary information.

7. The method of claim 1, wherein validating by the validation agent comprises:
   during a first stage of validating:
      inputting the first stream processing code into a language model,
      receiving feedback about the first stream processing code as output from the language model, and
      providing the feedback in the first validation report; and
   during a second stage of validating:
      inputting the first stream processing code and the first test file into a compiler that compiles the first stream processing code and executes the first stream processing code using the first test file,
      receiving output from the executed stream processing code, and
      summarizing the output for the first validation report.

8. The method of claim 1, wherein the code-generating workflow is one process of a plurality of processes.

9. The method of claim 1, wherein the first user input includes at least one of existing build-time feature engineering code or notebooks, and wherein the stream processing information includes a prompt goal, one or more steps for a stream processing logic, a source schema, a target schema, and an output format.

10. The method of claim 1, wherein extracting the first user intent comprises sending a prompt to a large language model (LLM) and receiving the first user intent responsive to the prompt.

11. A system comprising:
a computer processor;
a data repository in communication with the computer processor, wherein the data repository is configured to store:
a user input,
a user intent,
a stream processing code,
a test file, and
a validation report;
a supervising agent, when executed by the computer processor for a first time:
receives the user input,
extracts the user intent to generate the stream processing code from the user input, and
routes the user input to a code-generating workflow based on the user intent;
an extraction agent, when triggered by the code-generating workflow and executed by the computer processor:
receives the user input;
extracts stream processing information from a database based on the user input; and
generates a structured data model based on the stream processing information;
a code generating agent, when triggered by the code-generating workflow and executed by the computer processor:
receives the structured data model;
retrieves an example stream processing code from the database based on the structured data model;
receives an input schema and an output schema from a tool;
constructs a prompt for a code generation engine based on the structured data model, the input schema, the output schema, and the example stream processing code;
inputs the prompt to the code generation engine; and
receives the stream processing code and the test file from the code generation engine;
a validation agent, when executed by the computer processor:
receives the stream processing code and the test file from the code-generating workflow,
validates the stream processing code using the test file, and
generates the validation report indicating whether the stream processing code is validated; and
the supervising agent, when executed by the computer processor for a second time:
receives the validation report, and
transmits the stream processing code to a user responsive to the validation report indicating that the stream processing code is validated.

12. The system of claim 11, wherein the code generation agent comprises a large language model (LLM).

13. The system of claim 11, wherein the code generating agent further comprises:
transmitting, by the extraction agent, a request for supplementary information for the stream processing code from a user; and
receiving, by the extraction agent, the supplementary information from the user,
wherein generating, by the extraction agent, the structured data model is further based on the supplementary information.

14. The system of claim 11, wherein the validation agent executes:
a first validation process that:
inputs the stream processing code into a language model,
receives feedback about the stream processing code as output from the language model, and
provides the feedback in the validation report, and
a second validation process that:
inputs the stream processing code and the test file into a compiler that compiles the stream processing code and executes the stream processing code using the test file,
receives output from the executed stream processing code, and
summarizes the output for the validation report.

15. The system of claim 11, wherein the code-generating workflow is one process of a plurality of processes.

16. The system of claim 11, wherein the user input includes at least one of existing build-time feature engineering code or notebooks, and wherein the stream processing information includes a prompt goal, one or more steps for a stream processing logic, at least a source schema, a target schema, and an output format.

17. The system of claim 11,
wherein the supervising agent, when executed by the computer processor for a third time:
routes a second user input to the code-generating workflow based on a second user intent in the second user input; and
wherein the validation agent, when executed by the computer processor for a second time:
receives a second stream processing code and a second test file;
validates the second stream processing code using the second test file generated by the code-generating workflow;
generates a second validation report indicating that the second stream processing code is flagged; and
triggers a revision process responsive to the validation report flagging the second stream processing code, and
wherein the revision process is repeated until at least one of the stream processing code is validated or a number of revisions processes meets a predetermined revision process threshold.

18. A method comprising:
receiving, by a supervising agent, a user input;
extracting, by the supervising agent, at least a user intent to generate a stream processing code;

routing, by the supervising agent, the user input to a code-generating workflow based on the user intent, the code-generating workflow comprising:

receiving, by an extraction agent, the user input, extracting, by the extraction agent, stream processing information from a database based on the user input, generating, by the extraction agent, a structured data model based on stream processing information, receiving, by a code-generation agent, the structured data model, retrieving, by the code-generation agent, context from the database based on the structured data model, receiving, by the code-generation agent, an input schema and an output schema from a tool, constructing, by the code-generation agent, a prompt for a code generation engine based on the structured data model, the input schema, the output schema, and the context, inputting, by the code-generation agent, the prompt to the code generation engine, and receiving, by the code-generation agent, the stream processing code and at least one test file from the code generation engine;

receiving, by a validation agent, the stream processing code and the at least one test file generated by the code-generating workflow;

validating, by the validation agent, the stream processing code using the at least one test file;

generating, by the validation agent, a validation report indicating whether the stream processing code is validated or is flagged;

receiving, by the supervising agent, the validation report; and transmitting, by the supervising agent, the stream processing code to a user when the validation report indicates that the stream processing code is validated or triggering, by the supervising agent, a revision process when the validation report flags the stream processing code.

* * * * *